(No Model.)
J. T. WILSON.
ELECTRIC LOCOMOTIVE.
No. 507,396. Patented Oct. 24, 1893.
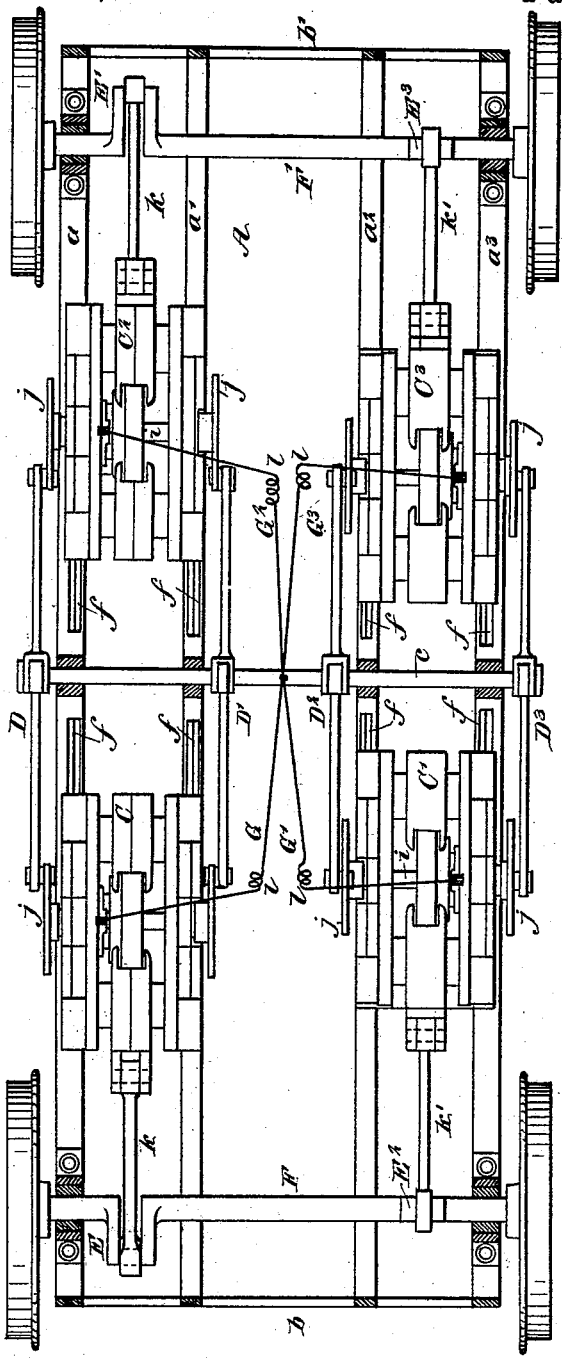
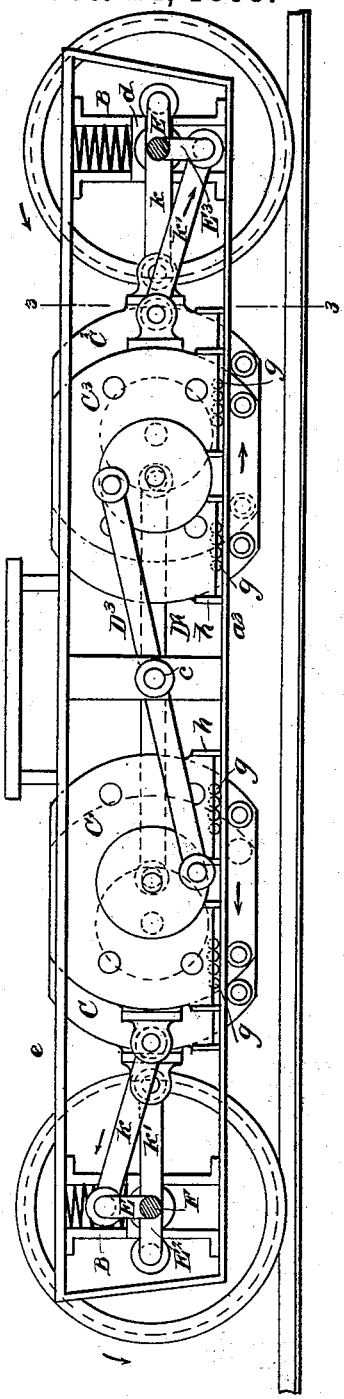
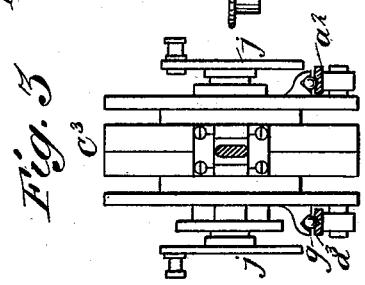
WITNESSES:
C. Neveux
C. Sedgwick
INVENTOR
J. T. Wilson
BY Munn & Co.
ATTORNEYS.

UNITED STATES PATENT OFFICE.

JAMES T. WILSON, OF TYRONE, PENNSYLVANIA.

ELECTRIC LOCOMOTIVE.

SPECIFICATION forming part of Letters Patent No. 507,396, dated October 24, 1893.

Application filed April 7, 1893. Serial No. 469,421. (No model.)

*To all whom it may concern:*

Be it known that I, JAMES T. WILSON, of Tyrone, in the county of Blair and State of Pennsylvania, have invented a new and Improved Electric-Motor Truck, of which the following is a specification, reference being had to the annexed drawings, forming a part thereof, in which—

Figure 1 is a plan view, partly in section, of my improved electric motor truck. Fig. 2 is a sectional side elevation; and Fig. 3 is a vertical transverse section taken on line 3—3 in Fig. 2.

Similar letters of reference indicate corresponding parts in all the views.

The object of my invention is to construct an electric motor truck, in which electric motors will be made to reciprocate and communicate motion to cranks on the car axles after the manner of a steam engine.

My invention consists in the combination, with a car frame provided with suitable ways, of electric motors having bearing surfaces with intermediate anti-friction rolls or balls supported by the ways of the car frame, cranks attached to the armature shafts and connected with levers pivoted to the car frame so as to cause two opposite motors to revolve in opposite directions and thus to reciprocate in opposite directions on their ways, thereby causing the reciprocation of one motor to counteract that of the other.

It also consists in connecting rods jointed to the motors and connected with cranks on the car axles in the usual manner, all as will be hereinafter more fully described.

The car frame A, is formed of the longitudinal beams $a$, $a'$, $a^2$, $a^3$, connected by the end bars $b$, $b'$ and the central rod $c$. The housings B of the axle boxes $d$ are secured to the beams $a$ $a^3$, and to the upper ends of the housings are secured beams $e$. In the beams $a$, $a'$, $a^2$, $a^3$, are formed ways $f$, which are fitted to receive friction rollers in the form of balls or cylindrical rollers $g$, and upon these balls or rollers rest electric motors C, C', C², C³, having guides furnished with grooves for receiving the balls or rollers $g$, and provided with guards $h$ for limiting the movements of the friction rollers.

The motors C, C', C², C³ are of well known construction and will therefore need no special description. The armature shaft $i$ of the said motors are each provided with cranks $j$, the cranks $j$ of each armature shaft being arranged at the same angle with reference to the armature and shaft.

On the rod $c$ are pivoted levers D, D', D², D³, which connect the cranks of the opposing motors, that is to say, the motors C, C² being in the same line, the cranks of their armature shafts are connected by the levers D, D'. In a similar way the cranks on the armature shafts of the motors C', C³ are connected by the levers D², D³.

The motors C, C', are connected with cranks E, E', on the car axles F, F', by connecting rods $k$, which are of the ordinary description, and the motors C', C³ are connected with cranks E², E³ on the axles F, F', by connecting rods $k'$, the said cranks E², E³ being arranged at right angles to the cranks E, E'. The current is conveyed to the motors C, C', C², C³ by conductors G, G', G², G³, which are provided with flexible joints $l$, to permit of the free movement of the conductors. The return current from the motors is carried through the car wheels and rails in the usual way. Arranged in this way the motors C, C² are bodily reciprocated on their ways when the armatures are made to revolve, and they reciprocate simultaneously in opposite directions so that their movements are counteracted each by the other. In a similar way the motors C', C³ are reciprocated, but the movement of these motors owing to the arrangement of the cranks, is intermediate.

The current, in case of using storage batteries will be returned direct from motors to batteries, or in case of trolley or shoe, to two under or over wires from power station, the current will be direct to and from the motor or motors.

Having thus described my invention, I claim as new and desire to secure by Letters Patent—

1. In an electric motor truck, the combination, with the car axles provided with cranks, of one or more pairs of electric motors arranged to reciprocate simultaneously in opposite directions and connected with the cranks of the axles, substantially as specified.

2. The combination, with reciprocating motors provided with cranks on their armature shafts, of connecting levers pivoted to a fixed support and connected with the opposing motors of each pair, substantially as specified.

JAMES T. WILSON.

Witnesses:
 ISAAC P. WALTON,
 R. G. STRYKER.